United States Patent
Lee et al.

(10) Patent No.: US 9,897,150 B2
(45) Date of Patent: Feb. 20, 2018

(54) INTEGRATED ACTUATOR FOR MULTI-MODE CLUTCH MODULE

(71) Applicant: BorgWarner Inc., Auburn Hills, MI (US)

(72) Inventors: Brett J. Lee, Southfield, MI (US); James R. Papania, Bolingbrook, IL (US)

(73) Assignee: BorgWarner Inc., Auburn Hills, MI (US)

( * ) Notice: Subject to any disclaimer, the term of this patent is extended or adjusted under 35 U.S.C. 154(b) by 389 days.

(21) Appl. No.: 14/576,392

(22) Filed: Dec. 19, 2014

(65) Prior Publication Data

US 2015/0176662 A1     Jun. 25, 2015

Related U.S. Application Data

(60) Provisional application No. 61/919,264, filed on Dec. 20, 2013.

(51) Int. Cl.

| F16D 25/061 | (2006.01) |
|---|---|
| F16D 41/067 | (2006.01) |
| F16D 41/06 | (2006.01) |
| F16D 1/06 | (2006.01) |

(52) U.S. Cl.
CPC ........... *F16D 25/061* (2013.01); *F16D 41/06* (2013.01); *F16D 41/067* (2013.01); *F16D 2041/0605* (2013.01)

(58) Field of Classification Search
None
See application file for complete search history.

(56) References Cited

U.S. PATENT DOCUMENTS

| 3,084,774 A | 4/1963 | Liang |
|---|---|---|
| 3,732,959 A | 5/1973 | Lang et al. |
| 4,382,495 A * | 5/1983 | Fleitas ............... B60K 17/3515 180/247 |

(Continued)

FOREIGN PATENT DOCUMENTS

WO     WO-01/11272 A1     2/2001

OTHER PUBLICATIONS

European Search Report for related European Application No. EP 14197509; report dated Jun. 3, 2016.

*Primary Examiner* — Colby M Hansen
(74) *Attorney, Agent, or Firm* — Miller, Matthias & Hull LLP

(57) ABSTRACT

A transmission clutch module includes first and second races, and a plurality of race engagement mechanisms situated between the races. The module incorporates an integrated hydraulic actuator having an actuator cam ring that includes cam ramps configured for moving the race engagement mechanisms between positions adapted to selectively interact with the races. As such, the actuator, designed to be contained entirely within a generally circumferential envelope of the clutch module, may control rotation of the actuator cam ring between at least two spaced angular positions in at least one embodiment. In various other embodiments within the scope of this disclosure, the actuator cam ring may be adapted to rotate among any number of pre-determined positions to operatively permit or prevent the transmittal of torque between the first and second races.

10 Claims, 4 Drawing Sheets

(56) References Cited

U.S. PATENT DOCUMENTS

| | | | |
|---|---|---|---|
| 5,297,450 A * | 3/1994 | MacPherson | F16D 41/088 192/223.2 |
| 5,720,375 A * | 2/1998 | Maeda | F16D 27/115 192/35 |
| 5,992,592 A | 11/1999 | Showalter | |
| 6,832,674 B2 | 12/2004 | Blair et al. | |
| 7,101,306 B2 | 9/2006 | Blair et al. | |
| 2005/0133329 A1 | 6/2005 | Gradu | |
| 2008/0110715 A1 | 5/2008 | Pawley | |

* cited by examiner

INTEGRATED ACTUATOR FOR MULTI-MODE CLUTCH MODULE

FIELD OF DISCLOSURE

The present disclosure relates generally to overrunning clutches for automatic transmissions, and more particularly to multiple mode clutch actuators employed in the operation of such clutches.

BACKGROUND OF DISCLOSURE

Although the present disclosure has applicability beyond automotive, an automotive example and discussion is herein provided for context only, and to specifically demonstrate at least one potential area of its utility.

Accordingly, an automotive vehicle includes an internal combustion engine containing a rotary crankshaft configured to transfer motive power from the engine through a driveshaft to turn the wheels. A transmission is typically interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutches adapted to dynamically shift among variously available gear ratios without requiring driver intervention. Pluralities of the clutches, also called clutch modules, are incorporated within such transmissions to facilitate the automatic gear ratio changes.

In an automatic transmission of an automobile, multiple gear ratios are generally available, not including a reverse gear. The various gears may be structurally comprised of inner gears, intermediate gears such as planet or pinion gears supported by carriers, and outer ring gears. Specific transmission clutch modules may be associated with specific sets of the selectable gears within the transmission to facilitate the desired ratio changes.

For example, one of the clutch modules of an automatic transmission associated with first (low) and reverse gear ratios may be normally situated at the front of the transmission and closely adjacent the engine crankshaft. The clutch may have an inner race and an outer race disposed circumferentially about the inner race. One of the races, for example the inner race, may be drivingly rotatable in only one direction. The inner race may be selectively locked to the outer race via an engagement mechanism such as, but not limited to, a roller, a sprag, or a pawl, as examples. In the one direction, the inner race may be effective to directly transfer rotational motion from the engine to the driveline.

Within the latter system, the outer race may be fixed to an internal case or housing of an associated planetary member of the automatic transmission. Under such circumstances, in a first configuration the inner race may need to be adapted to drive in one rotational direction, but freewheel in the opposite direction, in a condition referred to as overrunning. Those skilled in the art will appreciate that overrunning may be particularly desirable under certain operating states, as for example when a vehicle is traveling downhill. Under such circumstance, a driveline may occasionally have a tendency to rotate faster than its associated engine crankshaft. Providing for the inner race to overrun the outer race may act to reduce drag and/or spin losses, for example.

In a second configuration, such as when a vehicle may be in reverse gear, the engagement mechanisms may be adapted for actively engaging in both rotational directions of the inner race, thus not allowing for the overrunning condition in the non-driving direction.

In yet other configurations, a clutch module may switch between modes adapted to be locked in another direction of rotation in a third mode, and to freewheel in both directions of rotation in an alternate, or fourth, mode.

A significant issue has been related to actuators designed and adapted to switch clutch modules between their operative modes. Most such actuators have been bulky add-on, or adjunct, apparatus adapted to interact with the clutch module from outside of a generally circumferential envelope of the module, per se. As industry pressures have increasingly mandated reductions in footprints and/or sizes of automotive parts, improved actuators having such reduced footprints are needed.

SUMMARY OF DISCLOSURE

In accordance with one aspect of the disclosure, an integrated actuator for a multi-mode clutch module may be adapted for use in an automatic transmission. The actuator mechanism, as defined herein, is entirely contained within the generally circumferential envelope of the multi-mode clutch module. In one disclosed embodiment, the clutch module comprises an inner race; a fixed outer race disposed concentrically about the inner race, and a plurality of engagement mechanisms, such as pawls, circumferentially disposed between the inner and outer races. A cam ring is adapted to rotate or "clock" between two operating modes via the integrated actuator.

In one disclosed embodiment the cam ring interfaces with the engagement mechanisms to provide a first locked actuator mode, wherein inner race may be locked to the outer race in both driving and non-driving rotational directions. Conversely, a second actuator mode unlocks the inner and outer races to create a freewheeling of the races with respect to one another in both driving and non-driving rotational directions in that same embodiment.

In accordance with another aspect, the multi-mode clutch module includes an actuator hydraulically adapted to bi-directionally clock between hard stops at two circumferential positions, one position locking the inner and outer races together in at least one of its rotational directions, and a second mode allowing the inner and outer races to freewheel with respect to each other in both directions.

In accordance with another aspect, the multi-mode clutch module is configured to incorporate an actuator hub adapted to reactively engage the cam ring for circumferential movement against a spring force about the actuator hub.

In yet another aspect, the integrated actuator includes a system of circumferentially disposed seals seated within respective engaging actuator hub and cam ring members.

These and other aspects and features of the present disclosure may be better appreciated by reference to the following detailed description and accompanying drawings.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
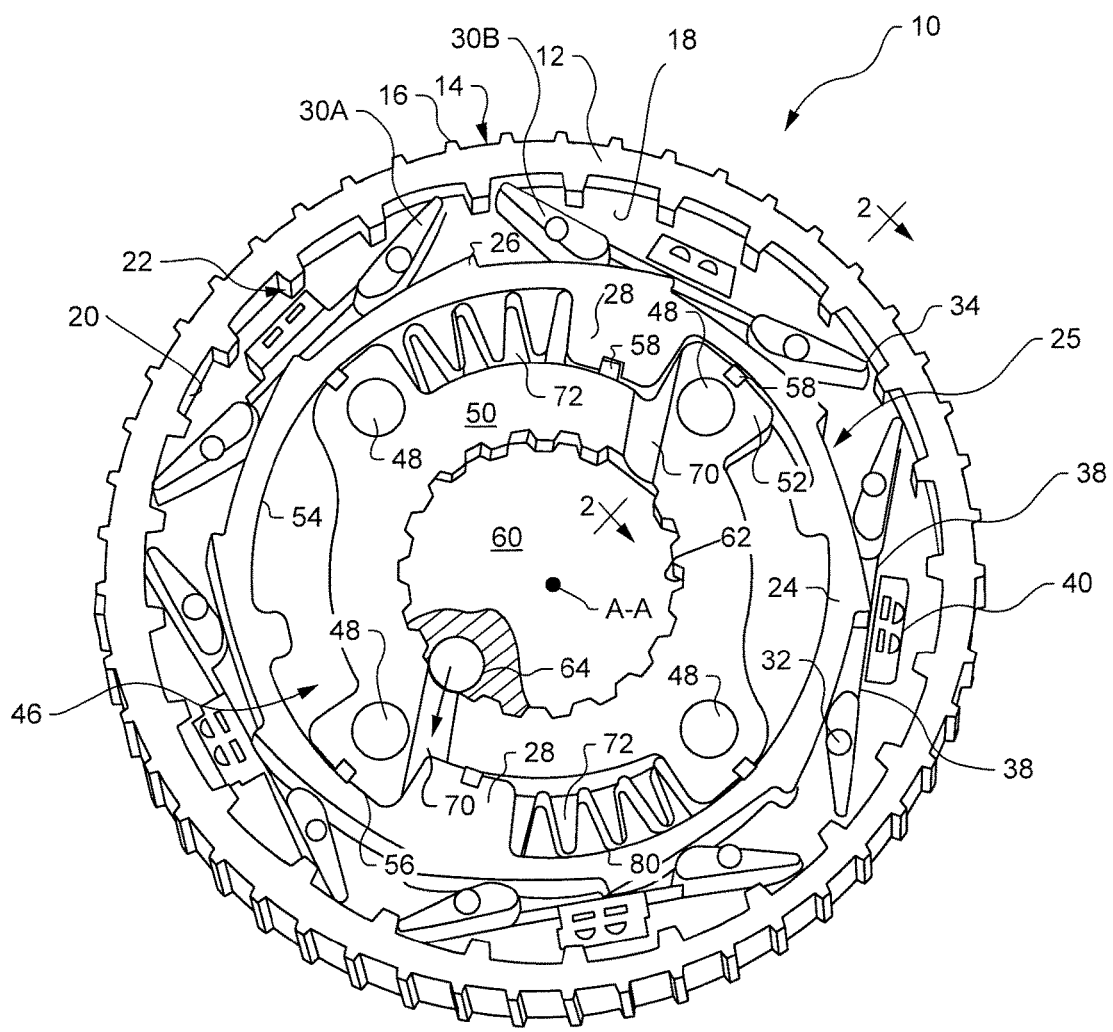
FIG. 1 is a perspective side view of a first embodiment of a clutch module that includes an integrated actuator constructed in accordance with the present disclosure, the clutch module shown without side plates to better reveal component details.
Figure 2:
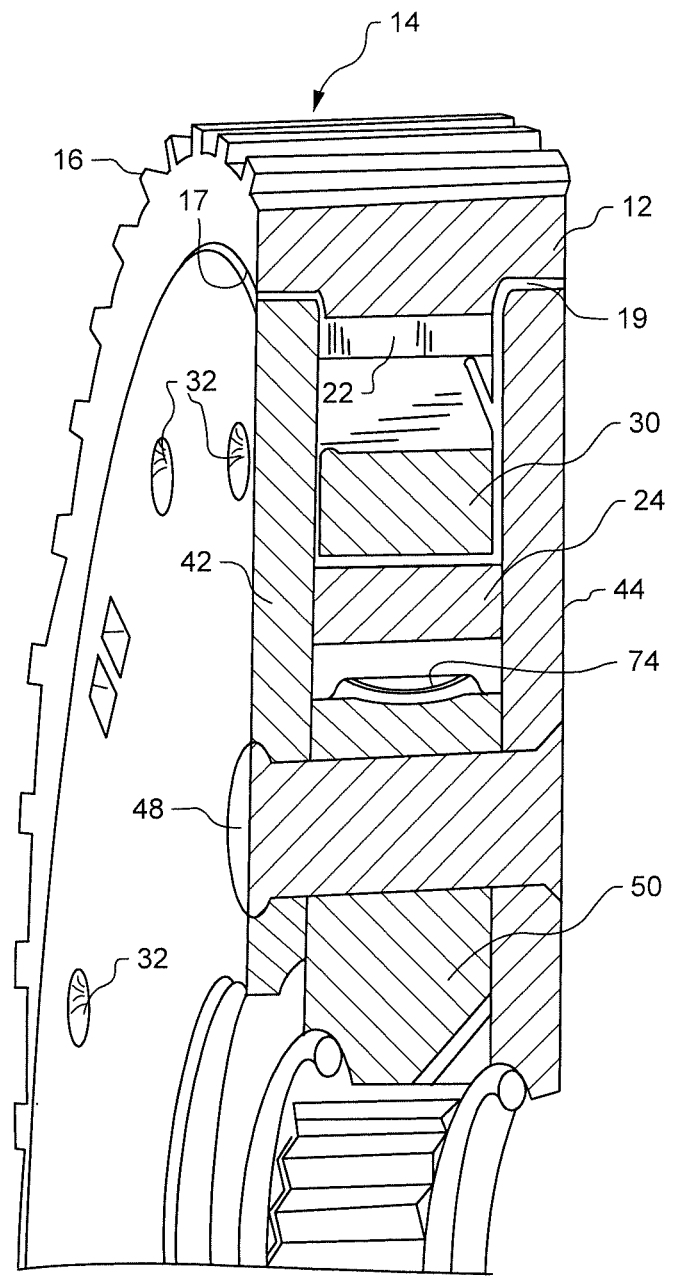
FIG. 2 is a perspective cross-sectional view of the same clutch module, taken along lines 2-2 of FIG. 1.

Referring initially to FIGS. 1 and 2, a multi-mode clutch module 10 may be utilized as a sub-unit of an automatic transmission (not shown). Such transmission may be employed in a front-wheel driven automobile, as only one example. The clutch module 10, having an axis A-A, may be employed as a part of a clutch suitable for use with a forward gearset, and may include an annular outer race 12 splined to a transmission component, not shown. For this purpose, the outside diameter 14 of the annular outer race 12 may contain splines 16 as shown to mate with and engage mating splines (not shown) of an input element of the transmission in this first described embodiment.

The interior diameter 18 of the annular outer race 12 incorporates a plurality of slots 20 in an array of evenly distributed spaces defined between teeth 22 that extend about the interior diameter 18. An interiorly situated annular cam ring 24 is positioned radially inwardly of the outer race 12; the outer diameter 25 of the cam ring 24 contains ramps 26 adapted to indirectly interface with the slots 20 and teeth 22 of the outer race 12, as will be further described herein.

In the first described embodiment, the cam ring 24 includes a pair of radially inwardly extending hydraulic bosses 28 adapted to actuate shifts between modes of the multi-mode clutch module 10. For this purpose, the cam ring 24 is adapted to bi-directionally rotate about axis A-A so as to "clock" between two limited angularly spaced stops.

Situated intermediately between the outer race 12 and the cam ring 24 are a plurality of engagement mechanisms, shown herein as pawls 30. The pawls 30 are adapted for selective interaction with the slots 20 and teeth 22 of the outer race 12 and the ramps 26 of the cam ring 24. For this purpose, the pawls 30 are arranged in sets of pairs as shown, wherein the pawls 30A are adapted, at least when interacting with teeth 22, to facilitate the transfer of torque in one direction, and pawls 30B are adapted to facilitate the transfer of torque in an opposite direction, as will be further explained below.

For purposes of accommodating pawl rotation, each pawl 30 contains a pair of axially projecting arms 32 (FIG. 2), each of the arms axially extending into a pair of left and right side plates 42 and 44, respectively. In fact, it will be appreciated that the side plates 42, 44 effectively encapsulate the multi-mode clutch module components, including the pawls 30, the cam ring 24, and other components to be described. In addition, it will be noted that the side plates 42, 44 may be piloted within a pair of axially spaced, circumferentially extending, slots 17, 19 situated in the interior diameter 18 of the outer race 12 to facilitate relative rotation of the side plates with respect to the outer race 12, or vice versa. Notably, the side plates 42, 44 are rigidly secured together by rivets 48 to a hub 50, described below. Thus, the side plates and all of the above-noted components contained within the side plates may be non-rotatable relative to the rotatable outer race 12, for example, as will be appreciated by those skilled in the art.

Referring now particularly to FIG. 1, each of the pawls 30 incorporates an outwardly biased toe end 34 adapted to interact with slots 20 and teeth 22 of the annular outer race 12. Each of the pawls also contains a heel end 36 adapted to interact with a ramp 26 of the cam ring 24. Interacting with each pawl 30 for this purpose is a cantilevered leaf-style spring 38 extending from a spring apparatus 40, the latter being fixedly secured to at least one of the side plates 42, 44. Each leaf spring 38 is adapted to interact with one heel end 36 of one pawl 30, as shown.

Situated radially inwardly of the cam ring 24, is an annular actuator hub 50. Within the above-described multi-mode clutch module 10, the hub 50 may be permanently splined to a transmission input shaft 60 in the first described embodiment, as shown. A radially outwardly extending hydraulic stop 52 of the hub 50 is adapted to interface with, and to limit amount of clocking of, the earlier noted hydraulic boss 28 of the cam ring 24. For this purpose, an interior diameter portion 54 of the cam ring 24 is piloted for limited rotation on an outside diameter portion 56 of the radially extending hydraulic stop 52. Hydraulic seals 58 are provided to seal between the cam ring 24 and the actuator hub 50, as will be further explained below.

For accommodating its interaction with the transmission input shaft 60, the hub 50 includes a splined interior diameter 62. The input shaft 60 interfaces with a source (not shown) of pressurized hydraulic fluid which travels through a fluid aperture 64 as can be viewed in the cutaway of the input shaft 60 in FIG. 1. The actuator hub 50 incorporates two radially oriented fluid passageways 70 for dynamically creating fluid pockets 72 that are controllably expansible and collapsible. Thus, when valves (not shown) adapted to control hydraulic fluid pressure are opened, the fluid flows radially outwardly of the input shaft 60, through the passageways 70, to create and expand hydraulic fluid pockets 72. Conversely when the valves are closed, the fluid flows radially inwardly out of the pockets 72 to cause the pockets to collapse.

A return spring 80 is circumferentially situated between each respective hydraulic boss 28 of the cam ring 24 and hydraulic stop 52 of the actuator hub 50. The return spring 80 is adapted to cause the fluid to be forced out of the pockets 72 whenever the hydraulic fluid valves have been closed. Thus, those skilled in the art will appreciate that the hydraulic actuator function described herein is essentially a single-acting hydraulic actuation with a spring return. Such single-acting system may be used, for example, to assure that the actuator ring 24 moves to a desired default position upon a failure of the hydraulic fluid pressure system, thus causing the multi-mode clutch module 10 to go into a preferred default mode for safety purposes, as just one example.

The scope of this disclosure is, however, not limited to such spring return, single-acting hydraulic actuation system.

For example, a double-acting hydraulic actuation system (not shown) could be employed, which would not require the return spring 80.

The side plates 42, 44 play a fundamental role in controlling the torque path through the multi-mode clutch module 10. As mentioned earlier, the pawls 30 have axial pivot arms 32 that extend into the apertures of the side plates 42, 44. As such, whenever the pawls interact with the teeth 22, those skilled in the art will appreciate that the torque path will flow directly from the input shaft 60 into the actuator hub 50, then through the rivets 48 into the side plates 42, 44. From the side plates, the torque path will flow through the pivot arms 32 of the pawls 30 into the toe ends 34 of the pawls, and hence into the outer race 12 via the teeth 22.

In addition to a passive role in torque path control, the tolerances of the side plates 42, 44 may be crucial for the overall functioning of the integrated actuator, depending on the application. Clearance tolerances between the cam ring 24 and the side plates may need to be controlled so that binding is avoided. On the other hand, excess leakage may also need to be avoided. In some cases, the tolerances may necessarily accommodate controlled leakage, particularly in applications where actuator duty cycles may be low. For applications requiring minimal leakage, polymer seals can be incorporated along axial faces of the side plates, as will be appreciated by those skilled in the art.

Figure 3:
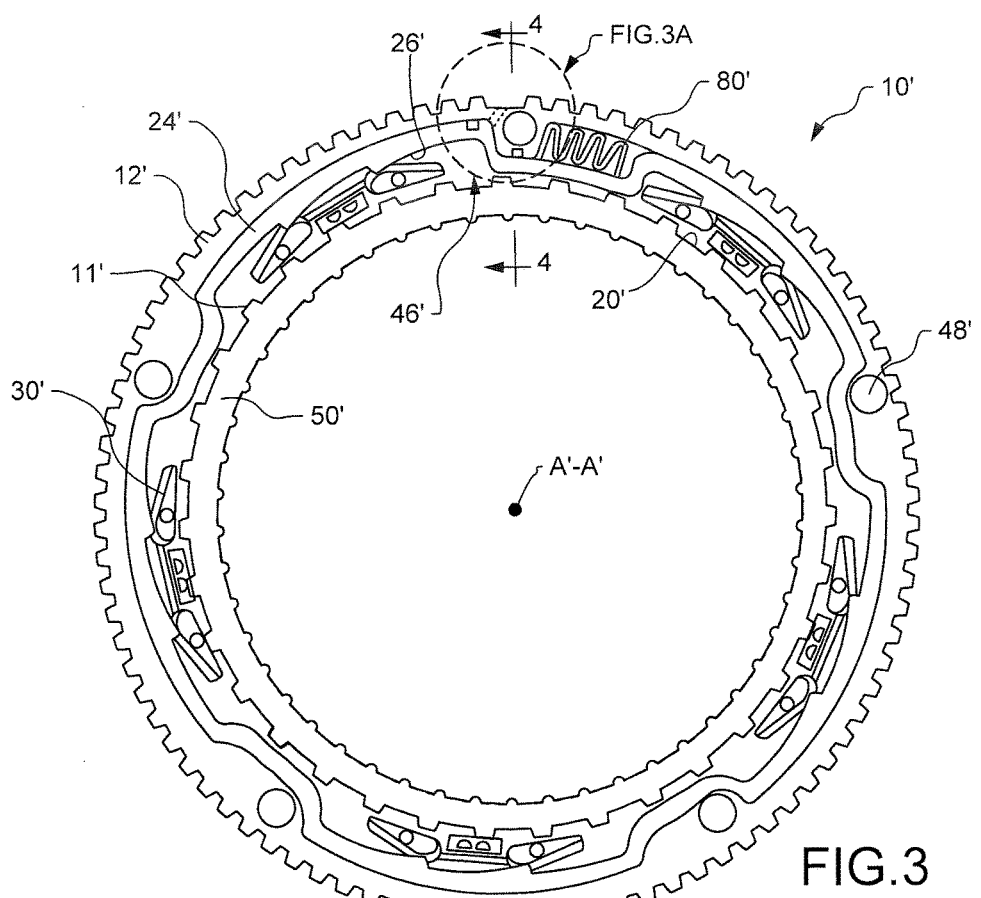
FIG. 3 is a side view of a second embodiment of a clutch module and actuator, also constructed in accordance with the present disclosure.
Figure 4:
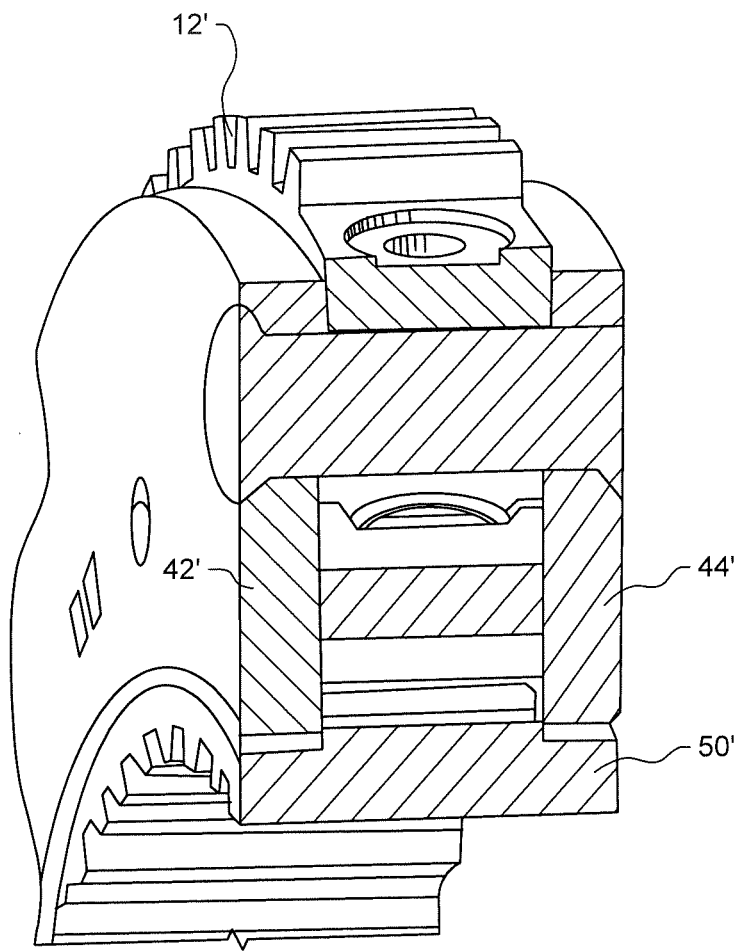
FIG. 4 perspective cross-sectional view of the second embodiment of the clutch module, taken along lines 4-4 of FIG. 3.

Referring now to FIGS. 3 and 4, an alternate embodiment of a multi-mode clutch module 10' may incorporate inverted and/or otherwise opposite characteristics relative to the first embodiment described in FIG. 1. For example, the inner race 50' may be adapted to engage a ring gear of a planetary gearset (neither shown) to accommodate a reverse gearset clutch function, as opposed to forward gearset clutch function described with respect to the first embodiment as shown in FIGS. 1 and 2. Thus, the inner race 50' includes radially outer (rather than inner) slots 20' and teeth 22' adapted to interact with a modified cam actuator ring 24' via pawls 30'.

The pawls 30' interact inversely with respect to their described functions of the first embodiment, and the spring apparatus 40' associated with respective sets of pawls are reversely positioned to achieve inverse functions as required in the second embodiment of the multi-mode clutch module 10'.

In the embodiment of FIGS. 3 and 4, the outer race 12' of the reverse clutch module 10' does not rotate, but is rotatably fixed within a transmission housing (not shown). FIG. 4 depicts side plates 42' and 44' that are analogous to the side plates 42 and 44 of the forward clutch module 10 (FIG. 2). A total of five rivets 48' secure the side plates 42', 44' together, analogously to the four rivets 48 adapted to secure the side plates 42, 44 of the first embodiment.

The reverse clutch module 10' contains only a single hydraulic actuator return spring 80', in lieu of the two return springs 80 of the forward clutch module 10 (FIG. 1). Similar to the embodiment of the clutch module 10, a double acting hydraulic actuator may alternatively be incorporated in the clutch module 10' for the same reasons provided earlier with respect to the clutch module 10. Each of the clutch modules 10, 10' may obviously be modified as necessary to meet the requirements of any given module design.

Finally, those skilled in the art will appreciate that the clutch module 10 may be physically nested within the clutch module 10' and used in conjunction with a planetary gearset to provide both forward and reverse functions for an automatic transmission (not shown) to, for example, accommodate a specific minimal sizing/packaging requirement.

Figure 3A:
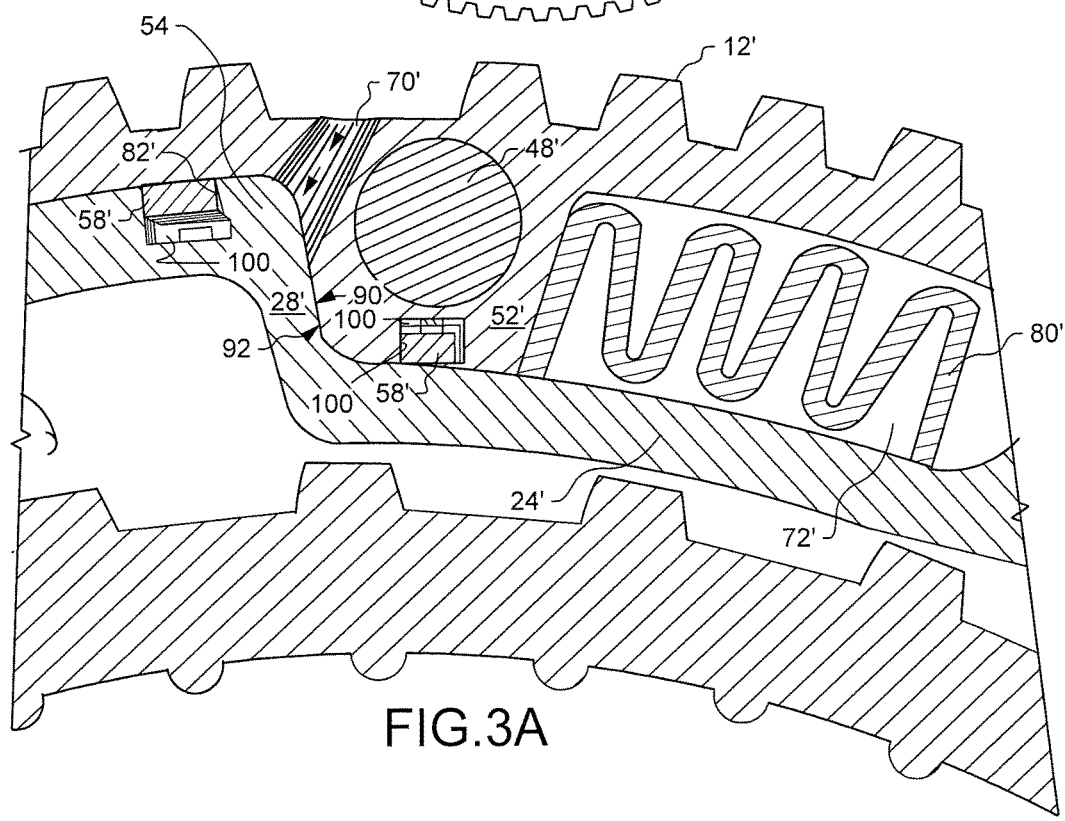
FIG. 3A is an enlarged view of a circled inset portion of the side view of FIG. 3.

Referring now to FIG. 3A, it will be apparent that the source of fluid required to form expansible and collapsible pockets 72' are inversely situated relatively to those of pockets 72, and must pass through the fluid passageway 70' of the outer race 12'. For this to occur, the fluid source must emanate from the transmission casing (not shown) to which the outer race 12' is splined.

Also within the second described embodiment, the hydraulic stop 52' is situated on the outer race 12' rather than on the inner race, i.e. the actuator hub 50, as in the first embodiment. Moreover, the hydraulic boss 28' is situated on a radially outer portion 54' of the cam ring 24' rather than on the radially inner portion 54 of the cam ring 24 as in the first embodiment.

Continuing reference to FIG. 3A, a pair of mating faces 90, 92 of the hydraulic boss 28' and hydraulic stop 52', respectively, cooperate with the fluid passageways 70' in a manner such that pressurized hydraulic fluid passing through the passageway 70' will force the mating faces 90, 92 circumferentially apart against the force of the spring 80' to thereby create a pocket 72'.

Figure 5:
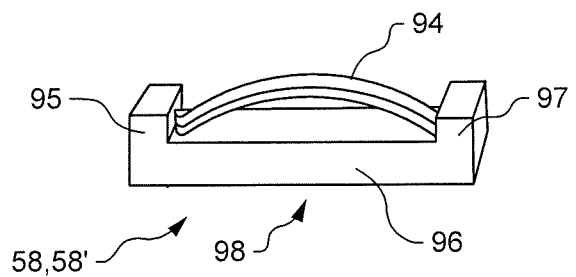
FIG. 5 is an enlarged perspective side view of a specific component of the embodiment of the clutch module of FIG. 5.

Referring now to FIG. 5, in order to assure leak-proof operation for handling hydraulic fluid flows, a set of spring-loaded hydraulic seals 58, 58' are utilized in both of the described first and second embodiments. For this purpose, recesses 82', 84' are provided in the boss 28' and stop 52', respectively, as shown. Each hydraulic seal 58' (FIG. 3A) is individually formed as both a spring 94 and a sealing insert 96 formed in the nature of a vane seal, as shown in FIG. 5.

The spring 94 may be formed in several practical configurations; a bowed leaf style, as depicted in FIG. 5, formed of spring steel, represents only one. The spring 94 is particularly essential for maintaining the sealing insert 96 in position while the hydraulic fluid is not under pressure. In the disclosed embodiment, the sealing insert 96 is defined by a pair of parallel ends or walls 95, 97 designed to capture respective ends of the bowed spring 94. In the described embodiment, the insert walls 95, 97 are situated orthogonally to the actual sealing face 98 of the sealing insert, as shown. The seal insert 96 may be formed of a variety of materials, including but not limited to sintered metal, plastics, and/or ceramics.

In operation, referring back to FIG. 3A, when pressurized hydraulic fluid flows into the passageway 70', the existing pocket 72' will collapse as a new pocket 72' will be formed between the faces 90 and 92, as earlier described. A space 100 situated radially behind the sealing insert 96 is provided by the bowed spring 94. Hydraulic fluid will flow into the space 100 to assure that sealing of the sealing insert 96 is actually effective. Without provision of such space 100, the hydraulic fluid could otherwise force the insert against a side edge of the recess 82, 84 within respective hydraulic boss 28' or hydraulic stop 52', as those skilled in the art will appreciate.

The structures herein described may have alternative configurations, even though not shown. The integrated actuator function of this disclosure could, for example, be configured to operate electrically instead of hydraulically. In addition, a biasing system involving a structure other than the accordion-style spring shown and described could be employed as a return. Although these modifications constitute only two examples, numerous other examples are applicable within the context of this disclosure.

Finally, in accordance with the above-described embodiments, at least some of the following elements may collectively constitute the herein defined integrated actuator 46, 46' of FIGS. 1 and 3, respectively, of this disclosure:

a) cam rings 24, 24'
b) cam ramps 26, 26'
c) hydraulic bosses 28, 28'
d) hydraulic boss face 90, 90'
e) hydraulic stops 52, 52'
f) hydraulic stop face 92, 92'
g) oil passageways 70, 70'
h) hydraulic return spring 80, 80'
i) side plates 42, 42', 44, 44'
j) actuator hub 50 (first embodiment)
k) outer race 12' (second embodiment)

INDUSTRIAL APPLICABILITY

A clutch module including the integrated actuator of this disclosure may be employed in a variety of vehicular applications, including but not limited to, automobiles, trucks, off-road vehicles, and other machines of the type having engines, automatic transmissions, and drivelines.

The disclosed actuator offers a unique approach to significantly reducing the size envelope and/or packaging of a clutch module of an automatic transmission. Such a benefit may be significant both in automotive transmissions and in numerous other applications where content density must be minimized, and/or packaging space is at a premium.

Although the disclosed actuator has been described in only two embodiments/configurations, numerous additional embodiments/configurations may fall within the scope of the appended claims.

For example, those skilled in the art will appreciate that the following configurations can be produced utilizing one of the above disclosed embodiments of either FIGS. 1 and 3:

a) A 2-mode device having a single cam ring, wherein the hydraulic actuator is single acting with a spring return;
b) A 2-mode device having a single cam ring with a double acting actuator;
c) A 3-mode device having a single cam with a single acting actuator with a spring return, wherein the position of the cam ring is measured with an electronic sensor, and a variable solenoid is used to modulate hydraulic fluid to control cam ring position; and
d) A 3-mode device with a single cam with a double acting actuator (position of cam being measured with sensor, and cam ring position controlled by a variable solenoid that modulates hydraulic fluid).
e) A 4-mode device utilizing a single cam with single acting actuator having a spring return (cam position measured via sensor, with variable solenoid being used to modulate hydraulic fluid to control cam ring position;
f) A 4-mode device with single cam and double acting actuator (position of cam being measured with sensor, with variable solenoid used to modulate fluid to control cam position; and
g) A 4-mode device with two cams, each controlled with its own actuator, and each actuator being either single acting with a spring return, or double acting without requiring a spring.

What is claimed is:

1. An actuator for switching a multi-mode clutch module among alternate operating modes, the module being defined by first and second races, and a plurality of engagement mechanisms circumferentially positioned between the races and mounted for rotation with the first race about an axis of the multi-mode clutch module; the actuator comprising:
   a hydraulic stop extending radially from the first race toward the second race;
   a cam ring positioned radially between and axially aligned with the first race and the second race, and having a hydraulic boss extending radially from the cam ring toward the first race and interfacing with the hydraulic stop to limit rotation of the cam ring about the axis relative to the first race;
   the hydraulic stop and the hydraulic boss cooperatively defining a pair of interactive faces adapted to selectively produce a circumferentially disposed, respectively expanding and contracting, hydraulic fluid pocket having a size based on a hydraulic fluid pressure between the hydraulic stop and the hydraulic boss;
   the cam ring configured to be rotatable relative to the first race among a plurality of predetermined fixed positions each corresponding to the size of the hydraulic fluid pocket for causing selective interaction of the engagement mechanisms with the second race relative to the first race for selectively controlling torque transfer between the races.

2. The actuator of claim 1, wherein the hydraulic stop defines a hydraulic stop face along one radial edge thereof.

3. The actuator of claim 2, wherein the cam ring defines an interior diameter, and wherein a portion of the interior diameter is piloted on the first race to support rotational movement of the cam ring relative to the first race.

4. The actuator of claim 3, wherein the cam ring interior diameter includes the hydraulic boss, the hydraulic boss adapted to reciprocally engage the hydraulic stop of the first race.

5. The actuator of claim 4, further comprising at least a pair of spring-loaded seals, the seals adapted for sealing between the first race and the cam ring, one supported within the hydraulic boss, the other supported within the hydraulic stop.

6. The actuator of claim 1, wherein the first race includes at least one oil passageway.

7. The actuator of claim 1, further comprising side plates, the side plates being axially situated to contain the cam ring rotatably therebetween, the side plates being non-rotatably secured together.

8. The actuator of claim 1, further comprising a hydraulic return spring biasing the hydraulic boss toward the hydraulic stop.

9. The actuator of claim 1, wherein upon an expansion of the hydraulic fluid pocket, the cam ring selectively prevents torque transfer between the races, such that the first and second races freewheel relative to one another in at least one direction in at least one modular clutch operating mode.

10. The actuator of claim 1, wherein upon collapse of the hydraulic fluid pocket, the cam ring selectively permits torque transfer between the first and second races in at least one direction in at least a second modular clutch operating mode.

* * * * *